(12) United States Patent
Tamalet et al.

(10) Patent No.: US 8,484,384 B2
(45) Date of Patent: Jul. 9, 2013

(54) ACARS ROUTER FOR REMOTE AVIONIC APPLICATIONS

(75) Inventors: Stephane Tamalet, Fonsorbes (FR); Gilles Gobbo, Aucamville (FR); Frederic Durand, Colomiers (FR); Jean-Georges Deville, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 384 days.

(21) Appl. No.: 12/676,772

(22) PCT Filed: Sep. 4, 2008

(86) PCT No.: PCT/EP2008/061707
§ 371 (c)(1),
(2), (4) Date: Mar. 9, 2010

(87) PCT Pub. No.: WO2009/034011
PCT Pub. Date: Mar. 19, 2009

(65) Prior Publication Data
US 2010/0262715 A1    Oct. 14, 2010

(30) Foreign Application Priority Data
Sep. 13, 2007   (FR) ...................................... 0757547

(51) Int. Cl.
*G06F 15/16*  (2006.01)
(52) U.S. Cl.
USPC .......................................... 709/250; 370/310

(58) Field of Classification Search
USPC ........................................... 709/250; 370/310
See application file for complete search history.

(56) References Cited

U.S. PATENT DOCUMENTS

| | | | |
|---|---|---|---|
| 7,020,708 B2 * | 3/2006 | Nelson et al. ................. | 709/230 |
| 7,395,344 B2 * | 7/2008 | Sandell et al. ................. | 709/230 |
| 2005/0286452 A1 * | 12/2005 | Hardgrave et al. ........... | 370/310 |
| 2006/0036773 A1 | 2/2006 | Syrtsov et al. | |

OTHER PUBLICATIONS

"RFC 1350—The TFTP Protocol (Revision 2)", (Internet RFC/STD?FYI/BCP Archives), Jul. 1992, 9 pages.
"AFDX Protocol Tutorial", Condor Engineering, AFDX / ARINC 664 Tutorial (1500-049), XP-002429136, 2005, 49 pages.

* cited by examiner

*Primary Examiner* — Adnan Mirza
(74) *Attorney, Agent, or Firm* — Oblon, Spivak, McClelland, Maier & Neustadt, L.L.P.

(57) ABSTRACT

An ACARS message communications system including at least one on-board piece of equipment harbouring an application adapted for transmitting and/or receiving ACARS messages, and a router adapted for routing, via a plurality of subnetworks, ACARS messages from and/or to the application. The piece of equipment and the router are connected to an AFDX network and the application is adapted for dynamic registration at the router, via the network, the router only routing the messages if the application is actually registered thereat.

9 Claims, 5 Drawing Sheets

ACARS ROUTER FOR REMOTE AVIONIC APPLICATIONS

TECHNICAL FIELD

The present invention generally relates to aeronautical telecommunications and more particularly to that of ACARS (Aircraft Communication and Reporting System) routing.

STATE OF THE PRIOR ART

In the aeronautical field, with the ACARS system, data may be transmitted between an aircraft and an earth-borne station, notably with exchange of information of the AOC (Aeronautical Operational Control) type with airline operators or information of the ATC (Air Traffic Control) type with air controllers.

The ACARS system may use several transmission media (also called media in the state of the art), or more exactly several subnetwork types for transmitting data, i.e. HF, VHF or SATCOM subnetworks. The VHF telecommunications subnetwork allows point-to-point links in direct line of sight with transmitters/receivers on the ground but with a reduced range. The satellite telecommunications subnetwork on the other hand provides worldwide coverage, except for the polar regions, but with high communications costs. The HF subnetwork as for it, provides coverage of the polar regions. The data link between onboard and the ground is generally designated by the generic term of <<datalink>> in the state of the art.

Generally, transmission of data to the ground is accomplished by means of an ACARS router. This router appears as a communications management piece of equipment or CMU (Communications Management Unit) which automatically selects the most suitable transmission medium (VHF, HF, SATCOM) according to a certain number of parameters, notably medium availability and its cost of use.

Figure 1:
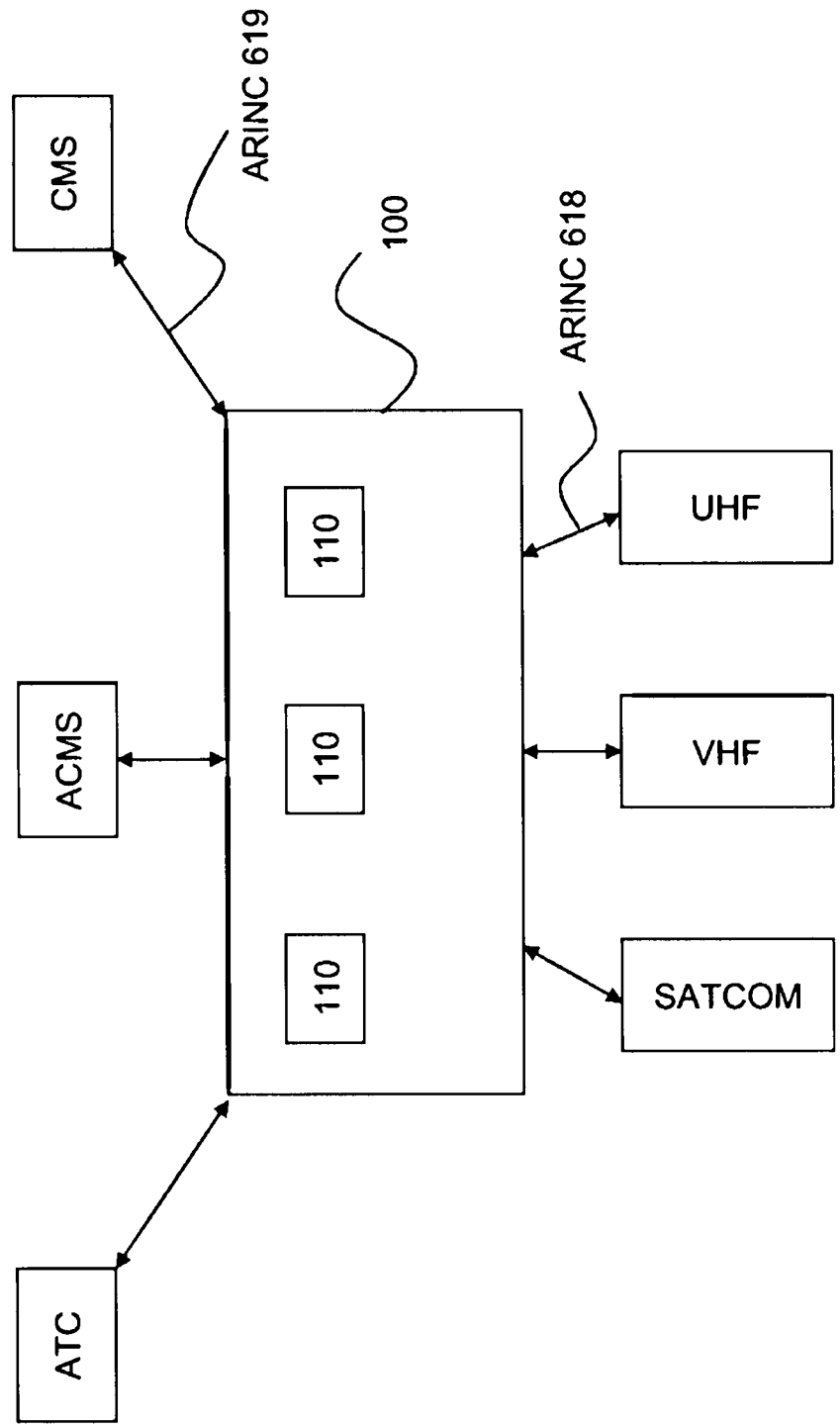

FIG. 1 schematically illustrates the architecture of a communications system using a conventional ACARS router, 100. Such a router may harbour one or more applications, 110, capable of transmitting and receiving data with the ground as ACARS messages. These applications are predefined during the building of the equipment. Adding a new application requires updating of the router (or even its replacement) as well as new certification. The setting up of a new application within the router is therefore a very cumbersome operation. The ACARS router may also be connected to remote avionic applications by means of dedicated point-to-point links of the Arinc 429 type. The protocol for transmitting ACARS messages over these links is defined in the Arinc 619 standard.

Remote avionic applications may be located in different types of LRUs (Line Replaceable Unit), for example an ACMS (Aircraft Condition Monitoring System) module for transmitting to the airline, information relating to the condition of the aircraft, an ATC module for receiving information from the air control, a CMS (Centralised Maintenance System) module for exchanging maintenance data. These applications converse with the router by means of dedicated interfaces provided during the design of the router. In other words, it cannot be envisioned that an additional application may use the ACARS service provided by the router. This would at the very least suppose the setting up of a new interface and therefore a new certification operation.

As this has just been seen, the conventional ACARS routers do not allow a progressive architecture. Any new avionic application resorting to the ACARS service requires new configuration and therefore new certification of the router.

The object of the present invention is to propose an ACARS router allowing a progressive communications architecture, which may easily be customized according to the needs of the various airlines.

DISCUSSION OF THE INVENTION

The present invention is defined by an ACARS message communications system comprising at least on-board equipments harbouring an application adapted for transmitting and/or receiving ACARS messages, a router adapted for routing said messages towards or from a plurality of subnetworks (HF/VHF/SATCOM), in which said piece of equipment and said router are connected to an AFDX network and said application is adapted so as to dynamically register at the router, via said network, the router only routing said messages if said application is actually registered thereat.

Typically, the application registers at the router by transmitting to it a registration request and by receiving in return a registration confirmation, said confirmation only being sent back by the router if the information contained in the request is determined as being valid by the latter.

In this case, the registration request and the possible registration confirmation are advantageously transmitted by means of an APOTA/TFTP/UDP/IP protocol stack wherein APOTA designates a protocol adaptation layer between a TFTP layer and the application, on the equipment side, and a protocol adaptation layer between an Arinc 618 layer and a TFTP layer, on the router side.

According to a first alternative embodiment, the router is adapted so as to carry out flow control on the ACARS messages from said application and to one of said subnetworks.

The router may control the flow of ACARS messages from said application, by comparing the size of each message with the available space in a receiving buffer and by sending back to said application a rejection message if the available space is smaller than the size of said message.

According to a second alternative embodiment, the router periodically sends to said application a test message, a first timer being reloaded with a first determined value ($T_{test}$) at each sending and a test message being sent every time that it times out, a fault of said application being detected if the router does not receive an acknowledgment of receipt of the test message before the time-out of said first timer.

Said application advantageously loads a second timer with a second value ($T_{mon}$) greater than said first value, during its registration at the router and at each reception of a test message, a fault of the router being detected if said second timer times out before receiving a test message.

Independently of the alternative embodiment, if the router detects an error affecting a message from a registered application, it may cancel its registration by deleting a code identifying said application from the list of registered applications.

In a similar way, if said application detects an error affecting a message from the router, it cancels its registration, the messages of said application still pending for transmission in the router being however routed towards one of said subnetworks.

The invention also relates to an aircraft comprising a communications system as defined above.

SHORT DESCRIPTION OF THE DRAWINGS

Figure 2:
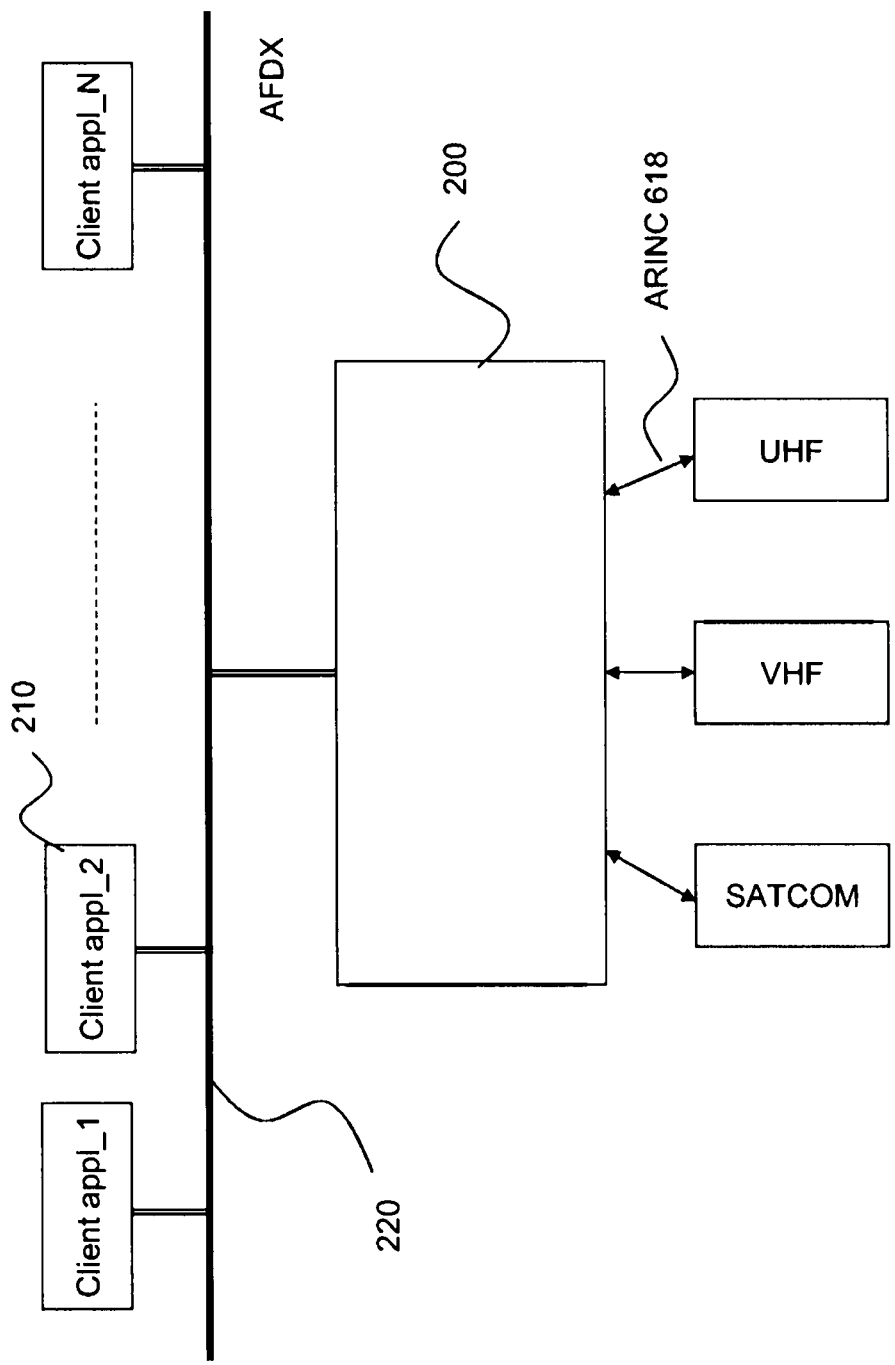
Figure 3:
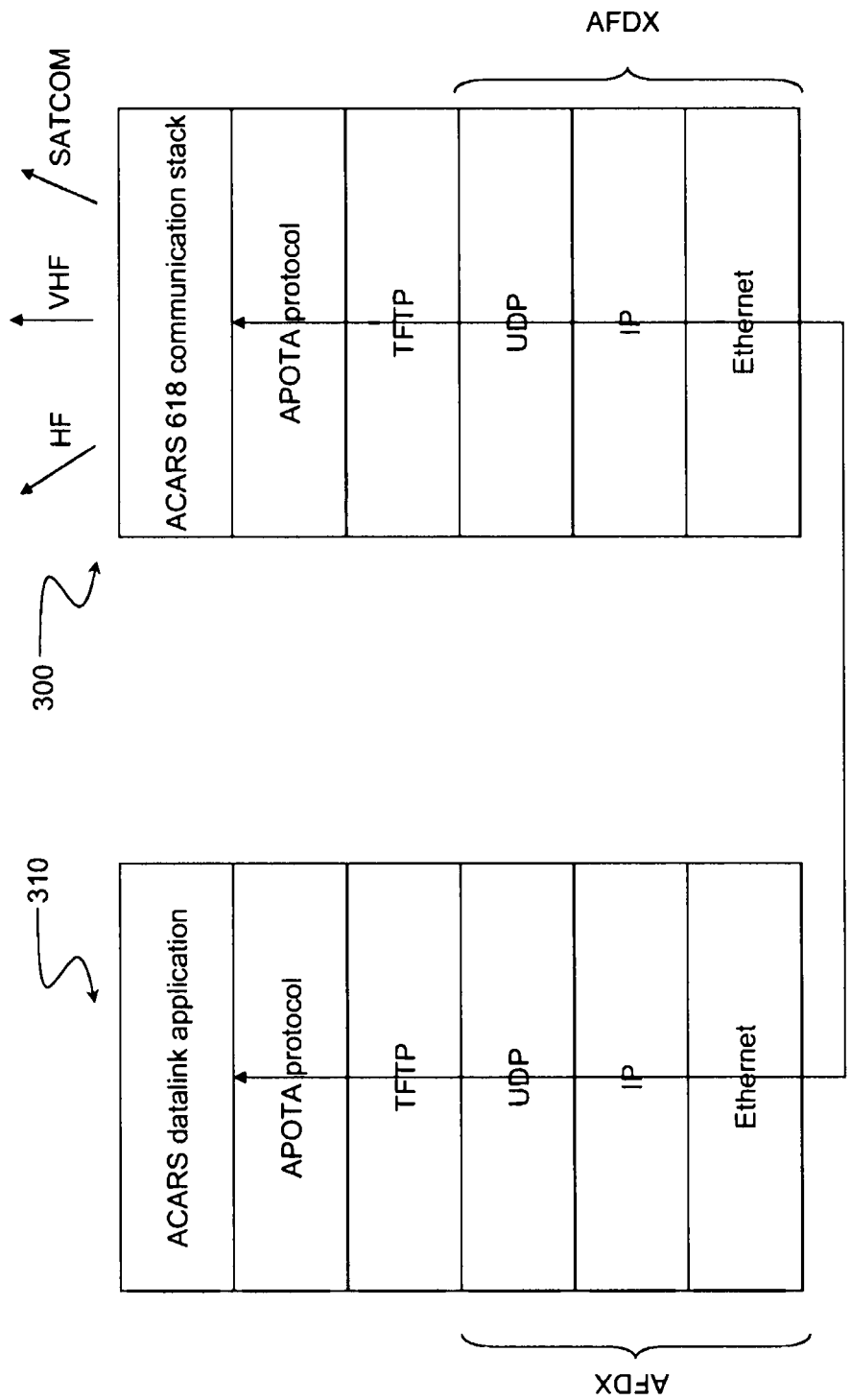
Figure 4:
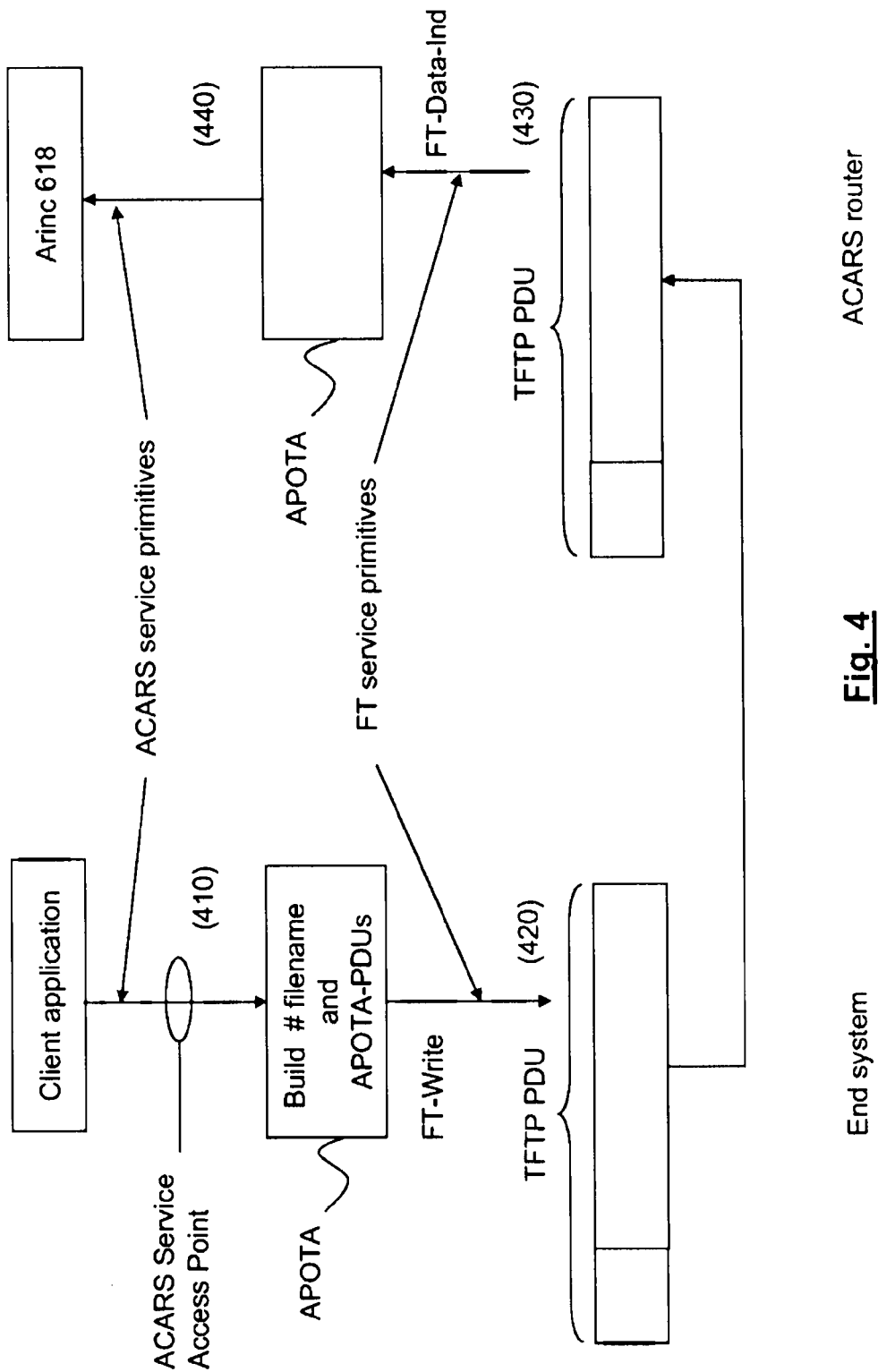
Figure 5:
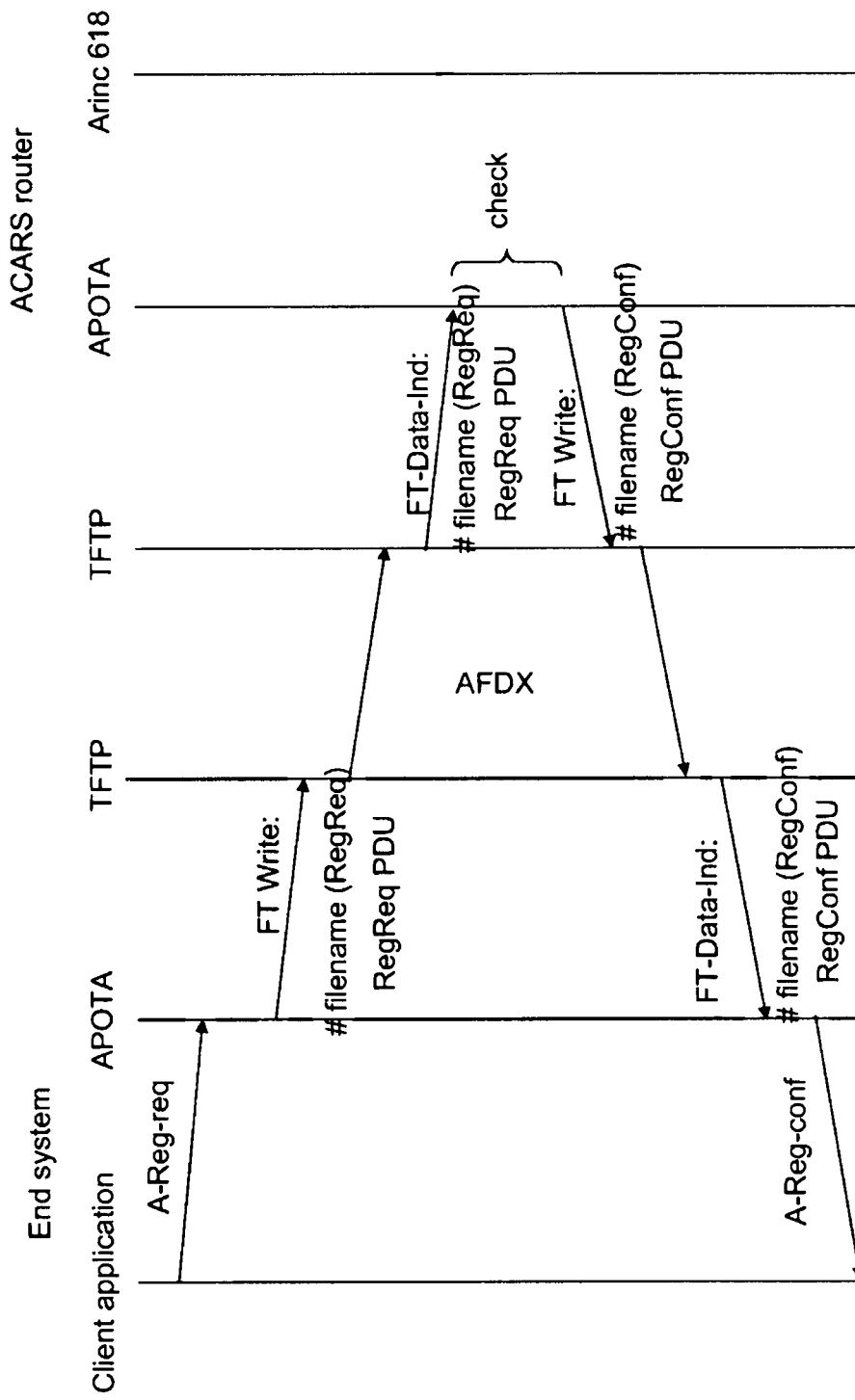

Other features and advantages of the invention will become apparent upon reading a preferential embodiment of the invention with reference to the appended figures wherein:

FIG. 1 schematically illustrates the architecture of an on-board communications system using an ACARS router, known from the state of the art;

FIG. 2 schematically illustrates the architecture of an on-board communications system using an ACARS router, according to an embodiment of the invention;

FIG. 3 schematically illustrates the protocol stacks applied in the system of FIG. 2;

FIG. 4 schematically illustrates a first functionality of the APOTA protocol layer of FIG. 3;

FIG. 5 schematically illustrates a method for dynamic registration of a remote application at the router, in the communications system according to the invention.

DETAILED DISCUSSION OF PARTICULAR EMBODIMENTS

In the following, it will be assumed that the aircraft is equipped with an AFDX (Avionics Full DupleX) network. It is recalled that the AFDX network developed for the needs of aeronautics is based on a switched Ethernet network and that it was subject to standardization in the Arinc 664 standard, part 7. A detailed description of this network will notably be found in the document entitled <<AFDX protocol tutorial>> available under the URL:

http://sierrasales.com/pdfs/AFDXTutorial.pdf.

The idea at the basis of the invention is to provide a protocol with which any application set up in a terminal piece of equipment (End System) connected to the AFDX network may be dynamically registered at the router in order to use the ACARS communications service. The relevant protocol in fact extends the access to the ACARS communications service to any remote application registered beforehand, as if it were harboured within the router or as if the on-board equipment were using an Arinc 619 protocol over an Arinc 429 dedicated link with the router.

FIG. 2 illustrates an on-board communications system using an ACARS router, 200, according to an embodiment of the invention. The router 200 as well as one or more pieces of equipment 210, harbouring applications noted as client appl_1, client appl_2, . . . , client appl_N, respectively, are connected to the AFDX 220. The pieces of equipment 210 are terminals (End Systems) in the sense of the Arinc 664 standard. The router is adapted for routing ACARS messages via a plurality of subnetworks, notably HF, VHF, SATCOM subnetworks, or even WiMAX or Wi-Fi subnetworks, the list not being a limitation.

Each of the client applications, client appl_1, client appl_2, . . . , client appl_N, is capable of using the ACARS service. For this, it has to be registered beforehand at the router according to a procedure detailed later on. Adding a new application does not require any modification of the hardware or software configuration of the router, so that it is not necessary to certify it again. It will be noted that this architecture provides both great modularity and flexibility of development. It will notably be possible to easily customize the ACARS communications system and to integrate proprietary applications therein, while keeping the same router.

FIG. 3 schematically illustrates the stacks of protocols 310 and 300 applied on the client application side and on the ACARS router side, respectively.

The low protocol layers of each stack consist of those of the AFDX network, i.e. the Ethernet link layer, of the IP network layer and of the UDP transport layer.

On the client application side, the application layer, noted here as <<ACARS datalink application>> may transmit ACARS messages to the router, conventionally in the Arinc 620 format. However, unlike the state of the art where these messages are transmitted over Arinc 429 links by using the Arinc 619 file transfer protocol, they are transformed here by the protocol adaptation layer noted as APOTA (ACARS Protocol Over TFTP and AFDX) before being transferred by means of a TFTP (Trivial File Transfer Protocol) session. A detailed description of the TFTP protocol will be found in document RFC 1350 available on the IETF site. It will simply be recalled here that the TFTP protocol is a very simple protocol for file transfer using UDP as an underlying transport layer.

The role of the APOTA layer in the protocol stack 310 is to provide an ACARS service (as an SAP or Service Access Point) to the remote avionic application, in other words to remotely deploy the ACARS service at the level of this application. To do this, the APOTA protocol layer converses with the upper application layer by means of ACARS service primitives and with the lower layer with file transfer service primitives (FT service primitives). It also exchanges packets noted as APOTA-PDUs (Protocol Data Units) with its counterpart in the protocol stack 300.

On the router side, the Arinc 618 protocol layer manages the ACARS communications with the ground. In the same way as earlier, the APOTA protocol layer of the stack 300 converses with the upper layer by means of ACARS service primitives and with the lower layer by means of file transfer service primitives. However, unlike the protocol stack 310, the APOTA protocol layer does not provide any ACARS service to the upper layer. Its main function is to provide the transport of ACARS messages by file transfer via the TFTP layer.

More generally, the APOTA protocol layer in a non-limiting way provides the following functions:
  remote deployment of the ACARS service of the router at the remote applications;
  dynamic registration of the remote applications, clients of the ACARS service;
  flow control on the downlink;
  detection of faulty client applications;
  detection of the loss of the ACARS service;
  coping with the errors.

FIG. 4 schematically illustrates the remote deployment mechanism of the ACARS service for a downlink, i.e. an air-ground (A/G) link.

The APOTA protocol layer encodes ACARS service primitives in 410, as well as their possible parameters, by generating file transfer primitives. The file to be transferred may contain one or more APOTA-PDU packets. The name of the file, noted here as <<#Filename>> generally comprises a code identifying the source application, a code identifying the addressee (i.e. the router) and a code indicating the type of message contained in the file.

The APOTA protocol layer in 420 orders the layer TFTP to transfer the file containing the APOTA PDU packets by means of a file transfer primitive noted as FT-Write. The TFTP layer then transfers the file #Filename, as TFTP PDU packets, according to the RFC 1350 standard. These standard packets are forwarded to the router via the AFDX network by means of the file transfer protocol TFTP. The APOTA protocol layer of the stack 300 is informed on the reception of the file #Filename by means of the FT-Data-Ind primitive. If the APOTA protocol layer accepts the file, it recovers the APODA-PDU packets which it contains. In step 440, the ACARS messages are extracted from the APOTA-PDU packets and transmitted to the Arinc 618 protocol layer. For an uplink, the APOTA protocol layers of the stacks 300 and 310 operate in a symmetrical way.

According to the invention, the sending of ACARS messages by a remote application assumes its prior registration at the router, according to a procedure illustrated in FIG. 5. Only the three upper protocol layers of the stacks 300 and 310 have been illustrated here for the sake of simplification.

The procedure is initiated by a request for registering the application, as an ACARS service primitive, noted here as A-Reg-req, transmitted to the APOTA protocol layer. This primitive allows the remote application to declare itself as a new client at the router and to indicate the ACARS labels and sub-labels which the application wishes to transmit or receive from the ground.

The APOTA protocol layer then generates a file transfer service primitive (FT-Write) having as parameters a file name #Filename(RegReq), an APOTA PDU packet noted here as RefReq PDU and a TFTP port number (not shown). The file name comprises the type of transmitted message, in the present case, a registration request, as well as the code identifying the source application.

Upon reception by the router, the TFTP layer transmits the file name #Filename(RegReq) received and the RegReq PDU packet. The RegReq packet contains i.a. the list of the ACARS labels and sub-labels which the application wishes to reserve.

The APOTA layer of the router checks whether the registration request is correct on the basis of the information contained in the file name and/or the transported RegReq PDU packet. If yes, the router locally registers the code of the relevant application before returning a registration confirmation message. On the other hand, if the registration request fails, the router sends back a registration failure message. The sending of the registration confirmation or failure message is performed as previously by means of a file transfer service primitive (FT-Write). In the present case, the registration is confirmed and the APOTA layer generates said primitive with as parameters the file name #Filename(RegConf) and the RegConf PDU packet.

Upon reception by the terminal, the confirmation message is processed by the APOTA layer and the confirmation is transmitted to the client application by means of an ACARS service primitive noted as A-Reg-conf.

The APOTA protocol layer also has the function of controlling flow on the downlink. This flow control is advantageously provided because of the throughput disparity between the AFDX network (100 Mb/s) and the VHF/HF/SATCOM subnetworks (less than 31 kb/s), causing a high risk of congestion at the router. It will be noted that a contrario no flow control mechanism is required on the uplink.

After having proceeded with its registration at the router, a remote application may send ACARS messages. To do this, a file transfer service primitive (FT-Write) is transmitted by the APOTA layer of the remote application to that of the router. This primitive has as parameters a file name notably comprising the code of the remote application, the type of message (uplink or downlink), and the size of the message.

When the APOTA layer of the router receives this request, it first of all checks whether the remote application is actually known and registered. By default, the request is rejected and the file transfer interrupted. It then checks the type of message, in order to determine if it has to carry out flow control. If yes (downlink), it checks whether the size of the message is smaller than the space available in its reception buffer. If this is actually the case, the TFTP transfer is accepted by the router. Otherwise, it is rejected and the APOTA layer of the router notifies this to the APOTA layer of the remote application by means of a service primitive indicating this rejection. The APOTA layer of the remote application then stops transmitting new requests.

When the reception buffer of the ACARS router becomes empty, either because a message which was stored therein has been transmitted to the ground successfully, or because the router has received a command for purging a message, it notifies this to the APOTA layer of the remote application by means of service primitives indicating confirmation of transmission to the ground and message purged, respectively. Upon receiving either one of these primitives, the APOTA layer of the remote application is allowed to transmit new requests.

Advantageously, the file name as an argument of the file transfer service primitive (FT-Write) may also comprise an indication of priority and/or an indication of routing strategy. These indications allow the router to hierarchically rank the incident flows on the one hand and to select for each incident message, the most suitable HF/VHF/SATCOM medium depending on their respective availability levels, on the other hand.

The APOTA protocol layer also allows detection of faulty client applications. A remote application is faulty if it is no longer capable of processing messages which are transmitted to it over an uplink.

In order to detect such a fault, the APOTA protocol layer of the router periodically sends a test message (noted here as <<Testlink>>) to each of the registered applications. Upon each sending, a timer is reloaded with a value ($T_{test}$) and, when the timer times out, a new test message is sent. If the message transfer fails for one of the applications, i.e. if the router does not receive from this application an acknowledgment of receipt before the time-out of said timer, the latter is considered as faulty. This detection mechanism allows the router to find out as rapidly as possible that a remote application is no longer available and to subsequently reject the messages from the ground which would be intended for it.

Vice versa, a remote application may detect loss of the ACARS service, for example in the case of a problem on the AFDX network. To do this, the remote application loads a timer with a value $T_{mon} > T_{test}$ during its registration at the router. The timer is then reloaded upon each reception of a test message (Testlink) with the value $T_{mon}$. If the timer times out, the application reaches the conclusion that a test message is absent and that the ACARS service is lost.

With the APOTA protocol layer, it is finally possible to cope with the errors which may occur in the ACARS service. More specifically when an error is detected, for example because a file transfer has failed, a received message is not properly formatted, the name of a file as an argument of a transfer request is erroneous or further a message is not allowed in the current state of the protocol layer, this error is handled in the following way:

When an error affecting a message from the remote application is detected by the router, the application is simply <<deregistered>> from the ACARS service. More specifically, its registration is cancelled by deleting the code of the application from the list of registered applications. The application is informed about this by a message and should register again in order to be able to access the ACARS service again.

In the same way, if an error affecting a message of the router is detected, the application is <<deregistered>> from the ACARS service and is informed about this by a message. However, unlike the previous case, its code is not deleted from the list of applications handled by the router. Its status simply switches from <<registered>> to <<deregistered>>, so that the router may continue to send to the ground, messages from this application which would still be pending for transmission in the buffer.

The invention claimed is:

1. An ACARS message communications system comprising:
   at least one on-board piece of equipment harbouring an application adapted for transmitting and/or receiving ACARS messages; and
   a router adapted for routing said ACARS messages towards or from a plurality of subnetworks,
   wherein said equipment and said router are connected to an AFDX network and said application is adapted for dynamic registration at the router, via a registration request that declares the application as a new client at the router, the registration request being transmitted across said AFDX network, and the router only routing said ACARS messages if said application is actually registered at the router,
   wherein the registration request and a possible registration confirmation are transmitted by an APOTA/TFTP/UDP/IP protocol stack, wherein APOTA designates a protocol adaptation layer between a TFTP layer and the application, on the side of the equipment, and a protocol adaptation layer between an Arinc 618 layer and a TFTP layer, on the router side.

2. The communications system according to claim 1, wherein said application registers at the router by transmitting to the router the registration request and receiving in return a registration confirmation, said confirmation only being sent back by the router if the information contained in the request is determined as being valid by the router.

3. The communications system according to claim 1, wherein the router is adapted for carrying out flow control on the ACARS messages from said application and to one of said subnetworks.

4. The communications system according to claim 3, wherein the router controls the flow of ACARS messages from said application, by comparing a size of each message with a space available in a reception buffer and by sending back to said application a rejection message if the available space is smaller than the size of said message.

5. The communications system according to claim 1, wherein the router periodically sends to said application a test message, a first timer being reloaded with a first determined value at each sending and a test message being sent every time it times out, a fault of said application being detected if the router does not receive an acknowledgment of receipt of the test message before the time-out of said first timer.

6. The communications system according to claim 5, wherein said application loads a second timer with a second value greater than said first value, upon its registration at the router and at each reception of a test message, a fault of the router being detected if said second timer times out before receiving a test message.

7. The communications system according to claim 1, wherein, if the router detects an error affecting a message from a registered application, the router cancels the registration of the application by deleting a code identifying said application from the list of the registered applications.

8. The communications system according to claim 1, wherein if said application detects an error affecting a message from the router, the router cancels the registration of the application, the messages of said application still pending for transmission in the router being however routed towards one of said subnetworks.

9. An aircraft comprising a communications system according to claim 1.

* * * * *